(12) United States Patent
Shao et al.

(10) Patent No.: US 11,898,704 B2
(45) Date of Patent: Feb. 13, 2024

(54) METHODS AND INTERNET OF THINGS SYSTEMS FOR SMART GAS PIPELINE LIFE PREDICTION BASED ON SAFETY

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Lei Zhang, Chengdu (CN); Yong Li, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/062,555

(22) Filed: Dec. 6, 2022

(65) Prior Publication Data
US 2023/0094640 A1    Mar. 30, 2023

(30) Foreign Application Priority Data

Oct. 14, 2022  (CN) .......................... 202211256470.5

(51) Int. Cl.
*F17D 5/00* (2006.01)
*G16Y 10/35* (2020.01)
(Continued)

(52) U.S. Cl.
CPC .............. *F17D 5/005* (2013.01); *F16L 55/32* (2013.01); *F17D 5/02* (2013.01); *F17D 5/06* (2013.01);
(Continued)

(58) Field of Classification Search
CPC ... F16L 55/32; F16L 2101/30; F16L 2201/30; F17D 5/06; F17D 5/02; G06N 20/00;
(Continued)

(56) References Cited

U.S. PATENT DOCUMENTS

2003/0011363 A1    1/2003  Wayman et al.
2014/0379280 A1   12/2014  Arai et al.
(Continued)

FOREIGN PATENT DOCUMENTS

CN    101071098 A    11/2007
CN    101488213 A     7/2009
(Continued)

OTHER PUBLICATIONS

First Office Action in Chinese Application No. 202211256470.5 dated Nov. 18, 2022, 21 pages.
(Continued)

*Primary Examiner* — Atif H Chaudry
(74) *Attorney, Agent, or Firm* — METIS IP LLC

(57) ABSTRACT

The present disclosure provides a method for smart gas pipeline life prediction based on safety. The method includes: obtaining the operation information of the target gas pipeline section within the first time period; determining, based on operation information, the first performance parameter of the target gas pipeline section of at least one moment within the first time period, the first performance parameter including at least the transport performance of the target gas pipeline section within the first time period; determining, based on the first performance parameter of at least one moment, the first performance parameter sequence of the target gas pipeline section within the first time period, the first performance parameter sequence being the sequence obtained by arranging the first performance parameters of at least one moment in chronological order; and determining, based on the first performance parameter sequence, the remaining life of the target gas pipeline section.

7 Claims, 8 Drawing Sheets

(51) Int. Cl.

| | | |
|---|---|---|
| *G16Y 40/50* | (2020.01) | |
| *F17D 5/02* | (2006.01) | |
| *G05D 1/02* | (2020.01) | |
| *F16L 55/32* | (2006.01) | |
| *F17D 5/06* | (2006.01) | |
| *G06N 3/088* | (2023.01) | |
| *G06N 20/00* | (2019.01) | |
| *G06N 5/04* | (2023.01) | |
| *G06N 3/08* | (2023.01) | |
| *G06N 20/20* | (2019.01) | |
| *G06N 5/025* | (2023.01) | |
| *G06N 3/042* | (2023.01) | |
| *G06N 3/049* | (2023.01) | |
| *G06N 3/02* | (2006.01) | |
| *G06N 7/01* | (2023.01) | |
| *G06N 3/047* | (2023.01) | |
| *G06N 3/045* | (2023.01) | |
| *G06N 5/022* | (2023.01) | |
| *G06N 5/046* | (2023.01) | |
| *G06N 3/044* | (2023.01) | |
| *G05B 19/042* | (2006.01) | |
| *G05B 19/4155* | (2006.01) | |
| *G05B 23/02* | (2006.01) | |
| *G05B 13/04* | (2006.01) | |
| *G06F 11/34* | (2006.01) | |
| *F16L 101/30* | (2006.01) | |
| *G06F 113/08* | (2020.01) | |

(52) U.S. Cl.
CPC ........ *G05B 13/048* (2013.01); *G05B 19/042* (2013.01); *G05B 19/4155* (2013.01); *G05B 23/024* (2013.01); *G05B 23/0283* (2013.01); *G05D 1/0221* (2013.01); *G06F 11/3447* (2013.01); *G06F 11/3452* (2013.01); *G06N 3/02* (2013.01); *G06N 3/042* (2023.01); *G06N 3/044* (2023.01); *G06N 3/045* (2023.01); *G06N 3/047* (2023.01); *G06N 3/049* (2013.01); *G06N 3/08* (2013.01); *G06N 3/088* (2013.01); *G06N 5/022* (2013.01); *G06N 5/025* (2013.01); *G06N 5/04* (2013.01); *G06N 5/046* (2013.01); *G06N 7/01* (2023.01); *G06N 20/00* (2019.01); *G06N 20/20* (2019.01); *G16Y 10/35* (2020.01); *G16Y 40/50* (2020.01); *F16L 2101/30* (2013.01); *F16L 2201/30* (2013.01); *G06F 2113/08* (2020.01); *G06F 2201/86* (2013.01)

(58) Field of Classification Search
CPC ............ G06N 3/08; G06N 5/04; G06N 20/20; G06N 3/049; G06N 3/088; G06N 5/025; G06N 7/01; G06N 3/02; G06N 3/042; G06N 5/022; G06N 3/047; G06N 5/046; G06N 3/045; G06N 3/044; G05B 23/024; G05B 23/0283; G05B 13/048; G05B 19/4155; G05B 19/042; G06F 2201/86; G06F 11/3447; G06F 11/3452; G06F 2113/08; G05D 1/0221; G06Q 50/06

See application file for complete search history.

(56) References Cited

U.S. PATENT DOCUMENTS

| | | | |
|---|---|---|---|
| 2016/0215918 A1 | 7/2016 | Cunningham | |
| 2017/0308796 A1* | 10/2017 | Heng | ...................... G06N 20/00 |
| 2021/0174973 A1* | 6/2021 | Munoz | ................... H04L 67/12 |
| 2022/0057367 A1* | 2/2022 | Claudio | ................... G06N 5/01 |
| 2022/0082409 A1* | 3/2022 | Ukil | ...................... G16Y 10/35 |

FOREIGN PATENT DOCUMENTS

| | | |
|---|---|---|
| CN | 108536926 A | 9/2018 |
| CN | 109977511 A | 7/2019 |
| CN | 110705176 A | 1/2020 |
| CN | 111783354 A | 10/2020 |
| CN | 112257327 A | 1/2021 |
| CN | 112800580 A | 5/2021 |
| CN | 113486494 A | 10/2021 |
| CN | 113536982 A | 10/2021 |
| CN | 114352947 A | 4/2022 |
| CN | 114390079 A | 4/2022 |
| CN | 114547822 A | 5/2022 |
| CN | 114626643 A | 6/2022 |
| CN | 114778687 A | 7/2022 |
| CN | 114818460 A | 7/2022 |
| CN | 115130232 A | 9/2022 |
| EP | 2902584 A2 | 8/2015 |
| JP | 2016033808 A | 3/2016 |
| WO | 2018044507 A1 | 3/2018 |

OTHER PUBLICATIONS

Guo, Lingyun et al., Time-dependent Failure Probability of Corroded Pipelines Based on Different Stochastic Degradation Processes, Acta Petrolei Sinica, 40(12): 1542-1552, 2019.

Teng, Wei et al., Data Driven Based Prognostic of Remaining Useful Life for Gas Turbine, Gas Turbine Technology, 30(2): 23-27, 2017.

Zhang, Xinsheng et al., Remaining Lifetime Prediction of Submarine Pipelines Based on Dynamic PSO-HSMM, Fire Science and Technology, 38(11): 1628-1632, 2019.

Notification to Grant Patent Right in Chinese Application No. 202211256470.5 dated Dec. 6, 2022, 8 pages.

* cited by examiner

METHODS AND INTERNET OF THINGS SYSTEMS FOR SMART GAS PIPELINE LIFE PREDICTION BASED ON SAFETY

CROSS-REFERENCE TO RELATED APPLICATION

This application claims priority of Chinese Application No. 202211256470.5, filed on Oct. 14, 2022, the entire contents of each of which are hereby incorporated by reference.

TECHNICAL FIELD

The present disclosure involves the field of gas pipeline safety, and specially involves a method for smart gas pipeline life prediction based on safety and the Internet of Things (IoT) system.

BACKGROUND

Gas pipeline transmission has become the preferred mode of gas transportation due to its advantages of low cost, safety and airtight, large transportation volume, easy control, and management. But gas has flammable and explosive characteristics, once a pipeline leakage occurs, a series of disasters such as explosion, fire, poisoning, and environmental pollution may be caused. If the disasters occur in residential areas, it will cause more serious harm. The causes of gas pipeline leakage mainly include external force damage, corrosion and aging of materials and device, illegal operation, and natural disasters.

There may be a leakage source of gas during pipeline transportation. Pipeline maintenance is a difficult process, and it is necessary to scree and replace high-risk gas pipeline sections in time before leakage occurs. Therefore, it is hoped to provide a method for smart gas pipeline life prediction based on safety and an Internet of Things system, which may realize the life prediction of gas pipelines.

SUMMARY

One or more embodiments of the present disclosure provide a safety based smart gas pipeline life prediction method. The method is implemented by the smart gas pipeline network device management sub platform. The method includes: obtaining the operation information of a target gas pipeline section within the first time period through a smart gas data center; determining, based on the operation information, the first performance parameter of the target gas pipeline section of at least one moment within the first time period, the first performance parameter at least including the transportation performance of the target gas pipeline section within the first time period; determining, based on the first performance parameter of at least one moment, a first performance parameter sequence of the target gas pipeline section within the first time period, the first performance parameter sequence being the sequence obtained by arranging the first performance parameters of at least one moment in chronological order; determining, based on the first performance parameter sequence, a remaining life of the target gas pipeline section.

One of the embodiments of the present disclosure provides an Internet of Things system for smart gas pipeline life prediction based on safety. The system includes a smart gas pipeline network device management sub-platform and a smart gas data center. The smart gas pipeline network device management sub-platform is used to obtain the operation information of the target gas pipeline section within the first time period through a smart gas data center; determining, based on the operation information, a first performance parameter of the target gas pipeline section at least one moment within the first time period, the first performance parameter at least including the transportation performance of the target gas pipeline section within the first time period; determining, based on the first performance parameter of at least one moment, the first performance parameter sequence of the target gas pipeline section within the first time period, the first performance parameter sequence being the sequence obtained by arranging the first performance parameters of at least one moment in a chronological order; determining, based on the first performance parameter sequence, the remaining life of the target gas pipeline section.

One or more embodiments of the present disclosure provide a computer-readable storage medium, wherein the storage medium stores computer instructions. When the computer reads the computer instructions in the storage medium, the computer executes the method for smart gas pipeline life prediction based on safety.

BRIEF DESCRIPTION OF THE DRAWINGS

The present disclosure will further explain in the form of exemplary embodiments, which will be described in detail by the attached drawings. These embodiments are not restricted. In these embodiments, the same number indicates the same structure, wherein.

DETAILED DESCRIPTION

Figure 1:
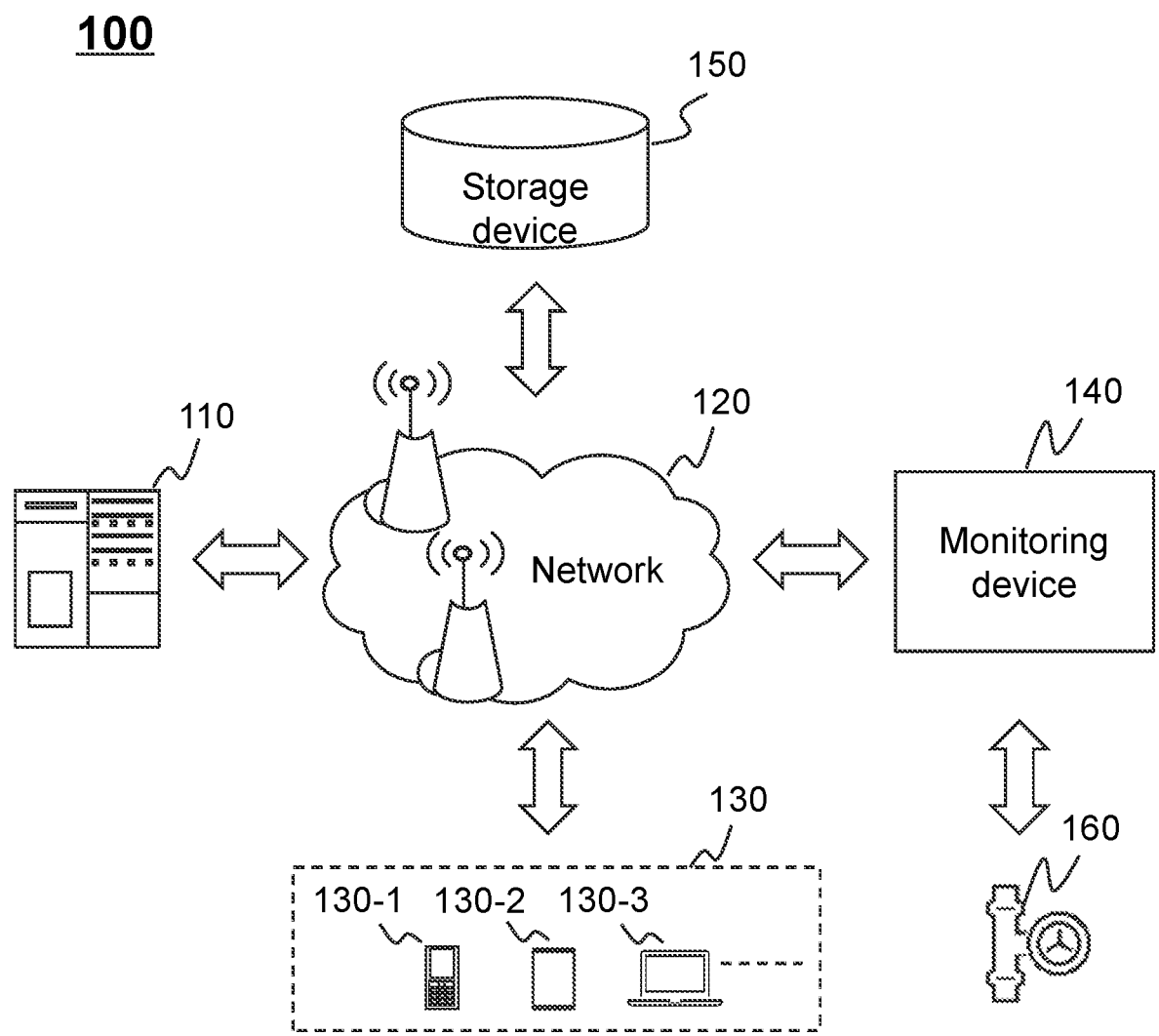
FIG. 1 is a schematic diagram of the application scenario of the Internet of Things system for smart gas pipeline life prediction based on safety according to some embodiments of the present disclosure.

In order to more clearly explain the technical solution of the embodiments of the present disclosure, the following will briefly introduce the drawings needed in the description of the embodiments. Obviously, the drawings in the following description are just some examples or embodiments of the present disclosure. For ordinary technicians in the art, the present disclosure can also be applied to other similar scenarios according to these drawings without any creative effort. Unless obviously obtained from the context or the context illustrates otherwise, the same numeral in the drawings refers to the same structure or operation.

It should be understood that the "system", "device", "unit" and/or "module" used herein is a method for distinguishing different components, elements, components, parts or assemblies at different levels. If other words can achieve the same purpose, they can be replaced by other expressions.

As shown in the description and claims, unless the context clearly indicates an exception, the words "one", "a", "an" and/or "the" do not specifically refer to the singular, but can also include the plural. Generally speaking, the terms "comprising" and "including" only indicate that steps and elements that have been clearly identified are included, but these steps and elements do not constitute an exclusive list, and methods or equipment may also include other steps or elements.

A flowchart is used in the present disclosure to explain the operation performed by the system according to the embodiment of the present disclosure. It should be understood that the preceding or following operations are not necessarily performed accurately in order. Instead, the steps can be processed in reverse order or simultaneously. At the same time, other operations may be added to these procedures, or one or more operations may be removed from these procedures.

FIG. 1 is a schematic diagram of the application scenario of the Internet of Things system for smart gas pipeline life prediction based on safety according to some embodiments of the present disclosure.

As shown in FIG. 1, application scenario 100 may include a server 110, a network 120, a terminal device 130, a monitoring device 140, a storage device 150, and a target gas pipeline section 160.

In some embodiments, the application scenario 100 may determine the remaining life of the target gas pipeline section by implementing the method for smart gas pipeline life prediction based on safety and/or the Internet of Things system disclosed in the present disclosure. For example, in a typical application scenario, the Internet of Things system for smart gas pipeline life prediction based on safety may obtain the operation information of the target gas pipeline section 160 within the first time period through the monitoring device 140; determine, based on the operation information, the first performance parameter of the target gas pipeline section 160 of at least one moment within the first time period through the server 110, the first performance parameter at least including the transportation performance of the target gas pipeline section 160 within the first time period; determine, based on the first performance parameter of at least one moment, the first performance parameter sequence of the target gas pipeline section 160 within the first time period through the server 110, the first performance parameter sequence being the sequence obtained by arranging the first performance parameter of at least one moment in chronological order; and determine, based on the first performance parameter sequence, the remaining life of the target gas pipeline section 160 through the server 110. For more information about the operation information, the first performance parameter, the moment, the first performance parameter sequence and the remaining life, please refer to FIG. 3 and its related description.

Server 110 may be connected to the terminal device 130 through network 120, and server 110 may be connected to the storage device 150 through the network 120. The server 110 may include the processing device, and the processing device may be used to perform a method for smart gas pipeline life prediction based on safety described in some embodiments of the present disclosure. The network 120 may connect the components of the application scenario 100 and/or the connect system with the external resource part. Storage device 150 may be used to store data and/or instructions. For example, the storage device 150 may store operation information, the first performance parameter, the first performance parameter sequence, the second performance parameter, the second performance parameter sequence, and the remaining life. Storage device 150 may be directly connected to the server 110 or inside the server 110. Terminal device 130 refers to one or more terminal devices or software. In some embodiments, the terminal device 130 may receive the remaining life of the target gas pipeline section sent by the processing device and display the remaining life to the user. By way of example, the terminal device 130 may include one or any combination of mobile device 130-1, tablet computer 130-2, laptop computer 130-3, or other devices with input and/or output functions. The monitoring device 140 may be used to obtain the operation information of the target gas pipeline section within the first time period. Exemplary, the monitoring device 140 may include a camera, a crawling robot, or the like. The target gas pipeline section 160 may be a pipeline or pipeline section for gas transportation requiring gas pipeline life prediction, for example, natural gas pipeline section, carbon dioxide pipeline section, etc.

It should be noted that the application scenario 100 is only provided for the purpose of explanation, and does not intend to limit the scope of the present disclosure. For ordinary technical personnel in the art, a variety of modifications or changes may be made according to the description of the present disclosure. For example, application scenario 100 may also include databases. For another example, application scenario 100 may achieve similar or different functions on other devices. However, changes and modifications will not depart from the scope of the present disclosure.

The Internet of Things system is an information processing system that includes part or all of the user platform, service platform, management platform, sensor network platform and object platform. The user platform is a functional platform to achieve user perception information acquisition and control information generation. The service platform may realize the connection of management platform and user platform, and play the role of sensing information service communication and control information service communication. The management platform may realize the overall planning and coordination of the connection and collaboration between various functional platforms (such as user platform and service platform). The management platform may gather the information of the operation system of the Internet of Things, and provide the perception management and control management functions for the operation system of the Internet of Things. The service platform may realize the connection of management platform and object platform, and play the role of sensing information service communication and control information service communication. User platform is a functional platform to achieve user perception information acquisition and control information generation.

The processing of information in the Internet of Things system may be divided into the processing process of user perception information and the processing process of controlling information. The control information may be generated based on user perception information. In some embodiments, the control information may include user needs control information, and user perception information may include user inquiry information. The processing of perception information is to obtain the perception information from the object platform and transfer the perception information to the management platform through the sensor network platform. The user demand control information is transmitted from the management platform to the user platform through the service platform, so as to control the sending of prompt information.

Figure 2:
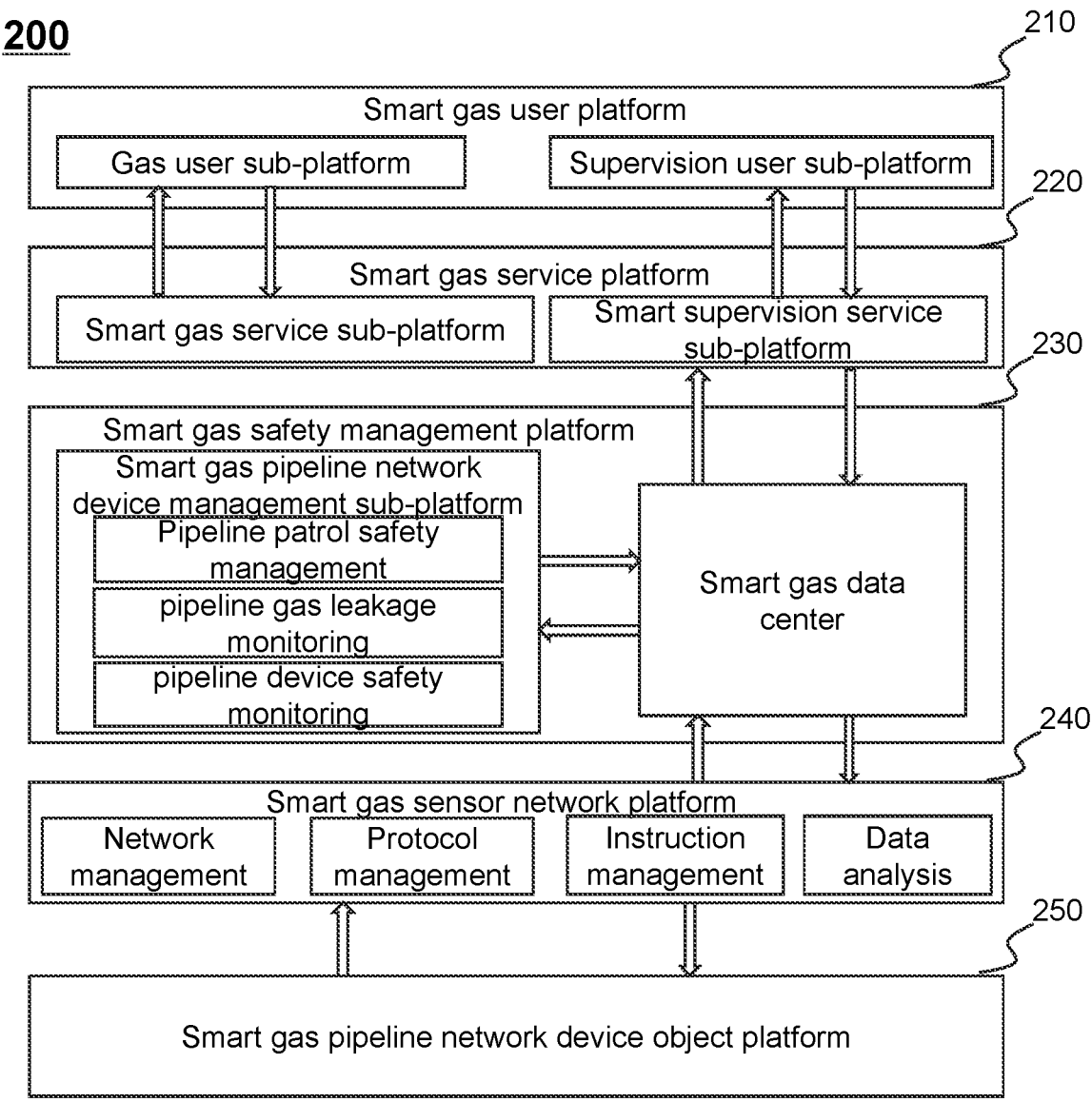
FIG. 2 is an exemplary module diagram of the Internet of Things system for smart gas pipeline life prediction based on safety according to some embodiments of the present disclosure.

FIG. 2 is an exemplary module diagram of the Internet of Things system for smart gas pipeline life prediction based on safety according to some embodiments of the present disclosure.

As shown in FIG. 2, the Internet of Things system 200 for smart gas pipeline life prediction based on safety (hereinafter referred to as the system 200) may include the smart gas user platform 210, the smart gas service platform 220, the smart gas safety management platform 230, the smart gas sensor network platform 240, and the smart gas pipeline network device object platform 250. In some embodiments, system 200 may be a part of the server or implemented by the server.

In some embodiments, the system 200 may be applied to a variety of scenarios for gas pipeline life prediction. In some embodiments, the system 200 may obtain a query instruction based on the query demand for gas pipeline life sent by the gas user, and obtain the query result according to the query instruction. In some embodiments, the system 200 may obtain operation information of the target gas pipeline section within the first time through the smart gas data center, determine, based on operation information, a first performance parameter of the target gas pipeline section within the first time, determining, based on the first performance parameter of at least one moment, a first performance parameter sequence of the target gas pipeline section within the first time period, and determine, based on the first performance parameter sequence, the remaining life of the target gas pipeline section. The first performance parameter includes the transport performance of the target gas pipeline section within the first time period. The first performance parameter sequence is a sequence obtained by arranging the first performance parameters of at least one moment in a chronological order.

A variety of scenarios of system 200 may include gas pipeline maintenance, gas pipeline leakage investigation, gas pipeline line laying, etc. It should be noted that the above scenarios are only examples and do not limit the application scenarios of the system 200. Technical personnel in this art may apply system 200 to any other appropriate scenarios on the basis of the content of the implementation of the present disclosure.

The smart gas user platform 210 may be a user-oriented platform for obtaining user needs and feedbacking information to users. In some embodiments, the smart gas user platform 210 may be configured as a terminal device, for example, smart devices such as mobile phones and computers.

In some embodiments, the smart gas user platform 210 may include a gas user sub-platform and a supervision user sub-platform. The gas user may receive the reminder information related to the remaining life of the target gas pipeline section sent by the smart gas service platform 220 through the gas user sub-platform. The supervision user may send the remaining life query instruction of the target gas pipeline section to the smart gas service platform 220 through the supervision user sub-platform. The gas user may be the user of the target gas pipeline section, and the supervision user may be the manager or government official of the target gas pipeline section. In some embodiments, the smart gas user platform 210 may obtain the user's input instructions and query the information related to the remaining life of the target gas pipeline section through the terminal device. For another example, the smart gas user platform 210 may feedback information related to the remaining life of the target gas pipeline section to user.

The smart gas service platform 220 may be a platform to provide information/data transmission and interaction.

In some embodiments, the smart gas service platform 220 may be used for information/or data interaction between the smart gas safety management platform 230 and the smart gas user platform 210. For example, the smart gas service platform 220 may receive the remaining life query instruction of the target gas pipeline section sent by the smart gas user platform 210, store and send the remaining life query instruction to the smart gas safety management platform 230, obtain information related to the remaining life of the target gas pipeline section from the smart gas safety management platform 230, store and process, and send the information to the smart gas user platform 210.

In some embodiments, the smart gas service platform 220 may include a smart gas service sub-platform and a smart supervision service sub-platform. In some embodiments, the smart gas service sub-platform may be used to receive the reminder information related to the remaining life of the target gas pipeline section sent by the smart gas safety management platform 230 and send the information to the gas user sub-platform. In some embodiments, the smart supervision service sub-platform may be used to receive the remaining life query instruction of the target gas pipeline section sent by the supervision user sub-platform and send the instruction to the smart gas safety management platform 230.

The smart gas safety management platform 230 may refer to the Internet of Things platform that integrates and coordinates the connection and cooperation among various functional platforms, and provides perceptual management and control management.

In some embodiments, the smart gas safety management platform 230 may be used for processing information and/or data. For example, the smart gas safety management platform 230 may be used for pipeline patrol safety management, pipeline gas leakage monitoring, pipeline device safety monitoring, etc.

In some embodiments, the smart gas safety management platform 230 may also be used for information and/or data interaction between the smart gas service platform 220 and the smart gas sensor network platform 240. For example, the smart gas safety management platform 230 may receive the remaining life query instruction of the target gas pipeline section sent by the smart gas service platform 220 (such as the smart supervision service sub-platform), store and process the instruction, and send the instruction to the smart gas sensor network platform 240, obtain the operation information from the smart gas sensor network platform 240, store and process the operation information, and send the operation information to the smart gas service platform 220.

In some embodiments, the smart gas safety management platform 230 may include the smart gas pipeline network device management sub-platform and the smart gas data center.

In some embodiments, the smart gas pipeline network device management sub-platform may be used to obtain the operation information of the target gas pipeline section within the first time period through the smart gas data center; and determine the first performance parameter of the target gas pipeline section of at least one moment within the first time period based on the operation information. The first performance parameter at least includes the transportation performance of the target gas pipeline section within the first time period. The smart gas pipeline network device management sub-platform may be further used to determine the first performance parameter sequence of the target gas pipeline section within the first time period based on the first performance parameter of at least one moment. The first performance parameter sequence is a sequence obtained by arranging the first performance parameter of at least one moment in chronological order. The smart gas pipeline network device management sub-platform may be used to determine the remaining life of the target gas pipeline section based on the first performance parameter sequence.

In some embodiments, the smart gas pipeline network device management sub-platform may be further used to obtain the image of the target gas pipeline section through a crawling robot; determining, based on the image, the pipeline integrity of the target gas pipeline section through an image recognition model, and the image recognition model is a machine learning model.

In some embodiments, the smart gas pipeline network device management sub-platform may be further used to determine the gas pipeline map corresponding to the target gas pipeline section through a smart gas data center, the gas pipeline map being a map of the connection relationship of multiple gas pipeline sections within a preset range of the target gas pipeline section; determine, based on the gas pipeline map, the transportation performance of the target gas pipeline section within the first time period by the transportation performance determination model, and the transportation performance determination model is a graph neural network model.

In some embodiments, the smart gas pipeline network device management sub-platform may be further used to predict the second performance parameter sequence of the target gas pipeline section within the second time period based on the first performance parameter sequence, and the second performance parameter sequence including performance parameter of at least one future moment; determine the remaining life of the target gas pipeline section based on the first performance parameter sequence or the second performance parameter sequence.

In some embodiments, the smart gas pipeline network device management sub-platform may be further used to obtain multiple performance degradation models; for each of the multiple performance degradation models, determine a goodness of fit between the first performance parameter sequence and each performance degradation model; determine, based on the goodness of fit between the first performance parameter sequence and each performance degradation model, the target performance degradation model from the multiple performance degradation models; determine the second performance parameter sequence based on the target performance degradation models.

In some embodiments, the smart gas pipeline network device management sub-platform may be further used to determine the second performance parameter sequence of the target gas pipeline section within the second time period through a performance parameter prediction model based on the first performance parameter sequence. The performance parameter prediction model is the time sequence prediction model.

In some embodiments, the smart gas pipeline network device management sub-platform may further be used to determine the second performance parameter sequence of the target gas pipeline section within the second time period through processing the first performance parameter sequence and environmental feature sequence through the performance parameter prediction model. The environmental feature sequence includes a plurality of weather data of the environment where the target gas pipeline section is located within the first time period and/or the second time period.

The smart gas data center may be a data management sub-platform for data storage, calling, and transferring. The smart gas data center may store historical data, for example, historical gas pipeline maps, historical first performance parameter, first performance parameter sequence, historical operation information, historical remaining life, etc. The above data may be obtained through manual input or historical execution of the method of the present disclosure. In some embodiments, the smart gas data center may be used to send the remaining life of the target gas pipeline section to the smart gas service platform 220.

For more information about the smart gas safety management platform 230, please refer to FIGS. 3, 4, 5, 6, 7 and their related descriptions.

The smart gas sensor network platform 240 may refer to a platform for unified management of sensor communication among platforms in the system 200 for gas pipeline life prediction based on the smart gas Internet of Things. In some embodiments, the smart gas sensor network platform 240 may be configured as a communication network and gateway. The smart gas sensor network platform 240 may adopt multiple groups of gateway servers or multiple groups of intelligent routers, which are not too limited here.

In some embodiments, the smart gas sensor network platform 240 may be used for network management, protocol management, instruction management, and data analysis. In some embodiments, the smart gas sensor network platform 240 may be used to send the remaining life of the target gas pipeline section to the smart gas data center.

The smart gas pipeline network device object platform 250 may be a functional device used for monitoring and transmission of target pipeline sections. In some embodiments, the smart gas pipeline network device object platform 250 may be configured as a monitoring device, for example, monitoring devices, cameras, crawling robots, etc. In some embodiments, the smart gas pipeline network device object platform 250 may send the obtained operation information to the smart gas safety management platform 230 through the smart gas sensor network platform 240.

In some embodiments of the present disclosure, the system for gas pipeline life prediction based on the smart gas Internet of Things may ensure the antagonism between different types of data, ensure the classified transmission and traceability of data and the classified issuance and processing of instructions, make the structure and data processing of the Internet of Things clear and controllable, and facilitate the control and data processing of the Internet of Things.

Figure 3:
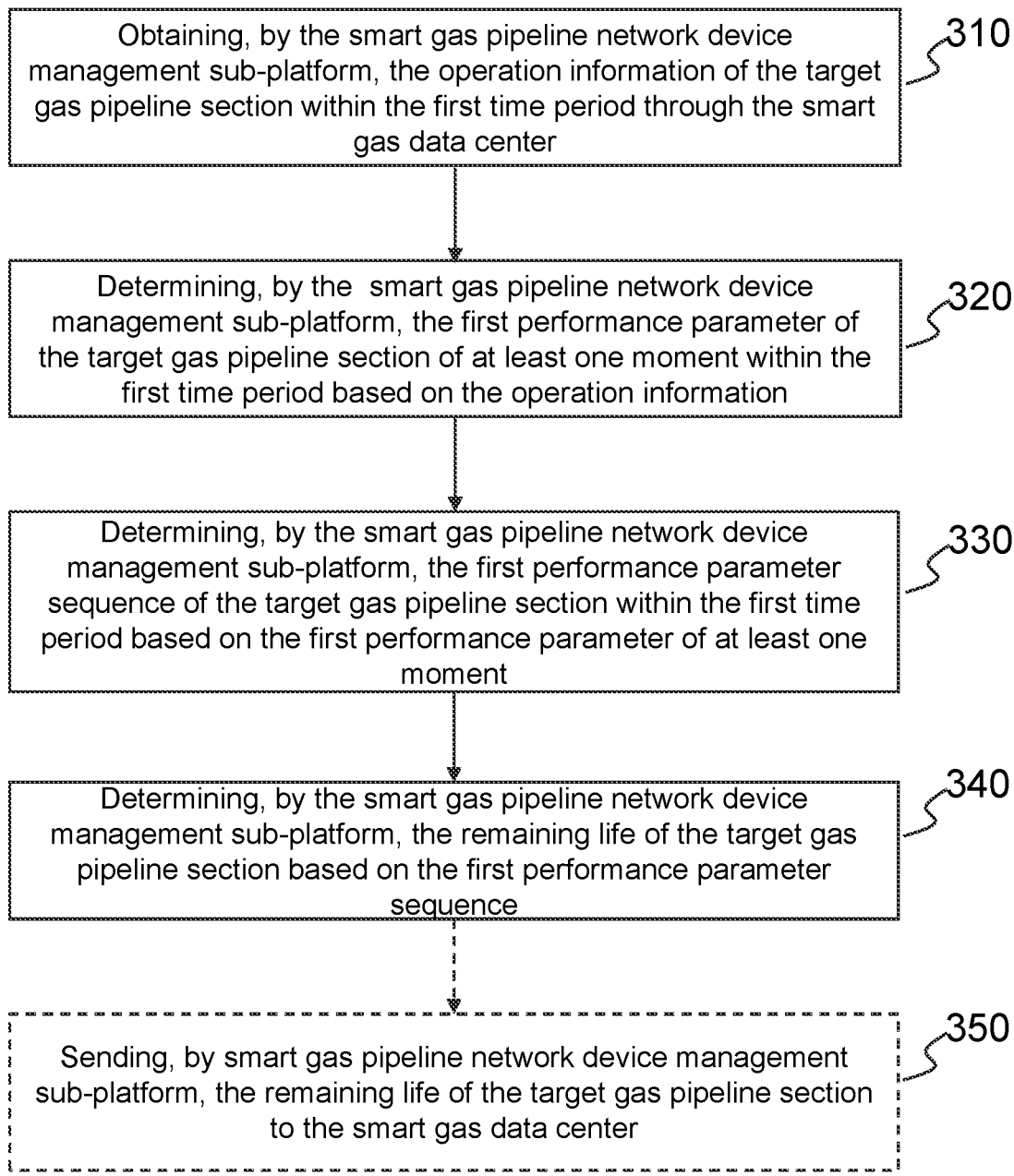
FIG. 3 is an exemplary flowchart of the method for smart gas pipeline life prediction based on safety according to some embodiments of the present disclosure.

FIG. 3 is an exemplary flowchart of the method for smart gas pipeline life prediction based on safety according to some embodiments of the present disclosure. In some embodiments, the process 300 may be implemented by the smart gas pipeline network device management platform. As shown in FIG. 3, process 300 includes the following steps.

Step 310, obtaining, by the smart gas pipeline network device management sub-platform, the operation information of the target gas pipeline section within the first time period through the smart gas data center.

The first time period may be a historical time period. For example, the first time period may be a 3-month of historical time period.

The operation information may be information related to the use of the target gas pipeline section. For example, the operation information may include the pressure, temperature, gas flow rate, etc. in the pipeline when the target gas pipeline section is used.

Step 320, determining, by the smart gas pipeline network device management sub-platform, the first performance parameter of the target gas pipeline section of at least one moment within the first time period based on the operation information.

The first performance parameter may be the parameter characterizing the performance of the target gas pipeline section at a certain moment. In some embodiments, the first performance parameter may also include the transport performance of the target gas pipeline section within the first time period. For specific explanations of transportation performance, please refer to FIG. 5 and its related descriptions. In some embodiments, the first performance parameter may also include the pipeline integrity of the target gas pipeline section within the first time period. For the specific description of the pipeline integrity, please refer to FIG. 4 and its related descriptions. In some embodiments, the first performance parameter may also include other content. For example, the first performance parameter may also include one or more in the load capacity, corrosion resistance, and mechanical strength of the target gas pipeline section at a certain moment. The first performance parameter may be represented by the value, for example, the stress value of the maximum load, the stress value of the mechanical strength, etc. In some embodiments, the first performance parameter may be determined by mathematical fitting, artificial intelligence, etc.

Step 330, determining, by the smart gas pipeline network device management sub-platform, the first performance parameter sequence of the target gas pipeline section within the first time period based on the first performance parameter of at least one moment.

In some embodiments, the first performance parameter sequence is a sequence obtained by arranging the first performance parameters of at least one moment in a chronological order. The chronological order may be positive or reverse.

Step 340, determining, by the smart gas pipeline network device management sub-platform, the remaining life of the target gas pipeline section based on the first performance parameter sequence.

The remaining service life may be the remaining service life of the target gas pipeline section. For example, the remaining life of the target gas pipeline section may be 9 months, 3 years, etc. In some embodiments, the remaining life of the target gas pipeline section may be obtained by processing the first performance parameter sequence through mathematical fitting, artificial intelligence processing, etc. For the specific description of the remaining life of the target gas pipeline section, please refer to FIG. 6 and its related descriptions.

In some embodiments, the process 300 may also include step 350: sending, by the smart gas pipeline network device management sub-platform, the remaining life of the target gas pipeline section to the smart gas data center.

In some embodiments, the smart gas data center may be used to send the remaining life of the target gas pipeline section to the smart gas service platform. The smart gas service platform may be used to send the remaining life of the target gas pipeline section to the smart gas user platform. The smart gas user platform may be used for user to query the remaining life of the target gas pipeline section.

Through the method for smart gas pipeline life prediction based on safety described in some embodiments of the present disclosure, the remaining service life of the target gas pipeline section may be predicted, and the remaining life of each pipeline section may be estimated in advance, which is conducive to the inspection of the pipeline network, the timely treatment of high-risk pipeline sections, and the avoidance of potential leakage risks.

Figure 4:
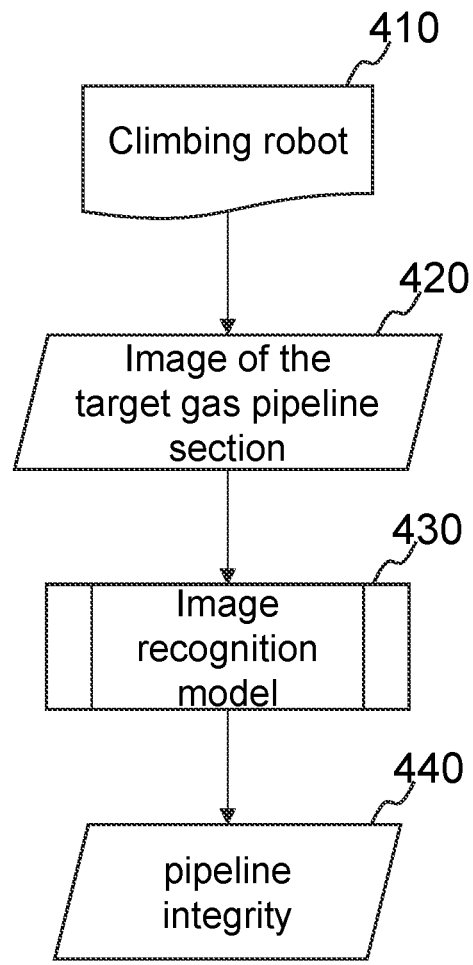
FIG. 4 is a schematic diagram for determining pipeline integrity according to some embodiments of the present disclosure.

FIG. 4 is a schematic diagram of determining the pipeline integrity according to some embodiments of the present disclosure.

In some embodiments, the first performance parameter may also include the pipeline integrity of the target gas pipeline section within the first time period. As shown in FIG. 4, the smart gas pipeline network device management sub-platform may be further used to obtain the image of the target gas pipeline section 420 by climbing robot 410, and determine, based on image of the target gas pipeline section 420, the pipeline integrity of the target gas pipeline section 440 through the image recognition model 430.

The climbing robot 410 may be a smart device that monitors the target gas pipeline section. In some embodiments, the climbing robot has the function of crawling in the inner wall of the target gas pipeline. For example, the climbing robot may include suction cups, magnetic material, and other structures, which is used to adsorb on the inner wall of the pipeline and crawls. In some embodiments, the climbing robot may obtain information related to the target gas pipeline section through the preset sensor. For example, the climbing robot may include infrared devices and cameras to obtain image of the target gas pipeline section 420 and the inner wall corrosion information. The climbing robot may include a temperature sensor for obtaining the temperature information in the target gas pipeline section. The climbing robot may include pressure sensors for obtaining pressure information in the target gas pipeline section. The climbing robot may include flow velocity sensors for obtaining air flow information in the target gas pipeline section. The climbing robot may include a humidity sensor for obtaining the humidity information in the target gas pipeline section. In some embodiments, the crawling robot may crawl and monitor by remote operations or the preset parameters of climbing robot. In some embodiments, the crawling robots may crawl on the outer wall of the target gas pipeline section to obtain the above information on the outer wall of the target gas pipeline section.

In some embodiments, the crawling robots may obtain images of the target gas pipeline section at a target frequency. The target frequency may be the frequency that the climbing robot obtains the information of the target gas pipeline section. In some embodiments, the target frequency may be related to the difference rate between the target gas pipeline section and other gas pipeline sections. For example, the target frequency corresponding to each difference rate may be determined through the preset relationship table between the difference rate and the target frequency. The difference rate may characterize the difference between the internal physical environment (such as temperature, pressure, humidity, etc.) of the target gas pipeline section and the reference gas pipeline section. For example, the temperature, pressure, humidity, and other parameters inside the historical gas pipeline section are called from the smart gas data center as the parameters of the reference gas pipeline section, and the parameters of the reference gas pipeline section are compared with the corresponding parameters of the target gas pipeline section to obtain the difference rate. The difference rate may be represented by percentage, for example, 10%. In some embodiments, when the difference rate between the target gas pipeline section and other gas pipeline sections is greater than the threshold value of the difference rate, it indicates that the internal physical environment of the target gas pipeline section may change due to factors such as leakage, corrosion and aging, and the target gas pipeline section may be an abnormal pipeline section with leakage risk. The difference rate threshold may be artificially set.

The image recognition model 430 may be a machine learning model, for example, the image recognition model 430 may be a convolutional neural network model. The input of the image recognition model 430 may include the image of the target gas pipeline section 420, and the output of the image recognition model 430 may include the pipeline integrity 440.

Pipeline integrity may be a parameter that characterizes the integrity of the pipeline. Pipeline integrity may be a specific value within 100. In some embodiments, the pipeline integrity may be determined by the degree of rupture, corrosion, bulge, and depression in the target gas pipeline section. The more serious the rupture, corrosion, bulge, and depression in the target gas pipeline section are, the smaller the pipeline integrity is.

In some embodiments, the image recognition model 430 may be trained through a large number of training samples and labels. Specifically, multiple groups of training samples with labels are input into the initial image recognition model, loss function is constructed based on the output of the initial image recognition model and labels, and parameters of the initial image recognition model are updated iteratively based on the loss function. In some embodiments, the training may be performed based on training samples through various methods. For example, training may be performed based on the gradient descent method. When the preset conditions are met, the training may be completed and the trained image recognition model may be obtained. The preset conditions may be that the loss function converges. In some embodiments, the training sample may include an image of a certain gas pipeline section in history, and the label may be the pipeline integrity corresponding to the image of a certain gas pipeline section in history. The label may be obtained by manual annotation.

In some embodiments of the present disclosure, the image and other information of the target gas pipeline section may be obtained by crawling robots, which may reduce the waste of human resources generated by manual measurement. The use of crawling robots may avoid affecting the normal operation of the gas pipeline. In addition, images may be further processed through image recognition model, which can improve the degree of intelligence of determination of the pipeline integrity and avoid the subjective impact of artificial determination.

Figure 5A:
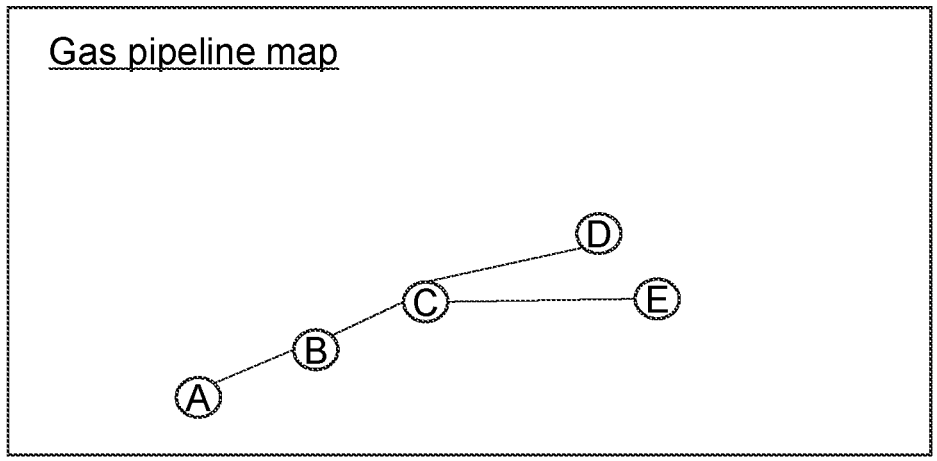
FIG. 5A is a schematic diagram of the gas pipeline map according to some embodiments of the present disclosure.
Figure 5B:
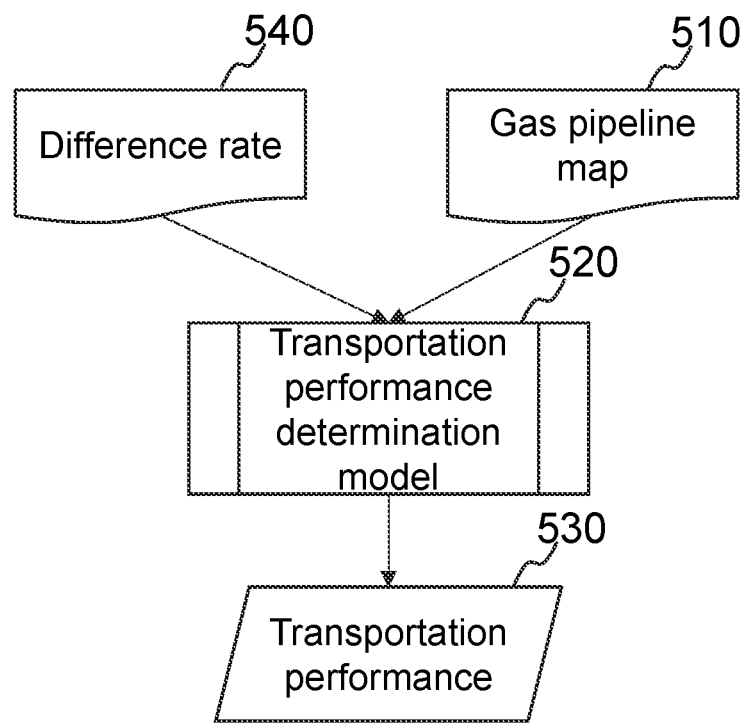
FIG. 5B is a schematic diagram for determining the transportation performance of the target gas pipeline section according to some embodiments of the present disclosure.

FIG. 5A is a schematic diagram of the gas pipeline map according to some embodiments of the present disclosure. FIG. 5B is a schematic diagram for determining the transportation performance of the target gas pipeline section according to some embodiments of the present disclosure. In some embodiments, the smart gas pipeline network device management sub platform may determine the gas pipeline map corresponding to the target gas pipeline section through the smart gas data center. For example, the smart gas data center calls the information of the historical gas pipeline section from the storage device and database to generate the gas pipeline map.

The gas pipeline map may be a map that reflects the connection relationship of multiple gas pipeline sections within the preset range of the target gas pipeline section. The nodes of the gas pipeline map may be the sections between the gas pipeline sections, gas storage points, gate stations or pipeline bends, and the edges of the gas pipeline map may be the gas pipeline sections. As shown in FIGS. 5A, A, B, C, D, E may be nodes, line segments AB, BC, CD, CE may be edges, and line segment CD may be the target gas pipeline section. In some embodiments, the node feature of the gas pipeline map may include the butt joint deviation between each gas pipeline section. The butt joint deviation may reflect the angle deviation and assembly error/tolerance of the butt joint structure between each gas pipeline section. For example, the angle deviation of node D is ±0.025°. It may be understood that the greater the butt joint deviation is, the greater the possibility of gas pipeline leakage is. In some embodiments, the butt joint deviation may be determined by manual input or measured by a crawling robot.

In some embodiments, the node feature of the gas pipeline map may also include whether to process the gas. For example, the node feature of node D may include the processing of pressurizing the gas, and node feature of node A may include the processing of depressurization the gas. In some embodiments, whether to process the gas may be expressed by feature values and vectors. For example, when the node feature of node D is the processing of pressurizing the gas by 100 Pa, the feature value of node D may be +100. In some embodiments, whether to process the gas may be determined by manual input. In some embodiments, the edge feature of the gas pipeline map may include pipeline parameters and pipeline maintenance situation. Pipeline parameters may include pipeline length, pipeline inner diameter, pipeline wall thickness, pipeline material and other information. Pipeline maintenance situation may include pipeline maintenance cycle, last maintenance time, etc. In some embodiments, pipeline parameters and pipeline maintenance situation may be determined by manual input. In some embodiments, the edge feature of the gas pipeline map may include pipeline integrity. The pipeline integrity may characterize the integrity of the pipeline section. In some embodiments, the pipeline integrity may be represented by a value within 100.

As shown in FIG. 5B, the smart gas pipeline network device management sub platform may determine the transportation performance 530 of the target gas pipeline section within the first time period through the transportation performance determination model 520 based on the gas pipeline map 510.

Transportation performance 530 may be a parameter characterizing the gas carrying capacity of the target gas pipeline section. The transportation performance may be expressed by a numerical value within 100. It may be understood that the better the transportation performance of the target gas pipeline section at a certain time is, the greater the remaining life of the target gas pipeline section at that time is.

Transportation performance determination model 520 may be a machine learning model, for example, the neural network model, etc. The input of the transportation performance determination model 520 may include the gas pipeline map 510, and the output of the transportation performance determination model 520 may include the transport performance 530.

In some embodiments, the input of the transportation performance determination model 520 may also include the difference rate between multiple gas pipeline sections of 540. The difference rate 540 may be used as input of the transportation performance determination model 520 alone, or the difference rate 540 may be used as node feature of the gas pipeline map inputted into the transportation performance determination model 520. For descriptions of the difference rate, please refer to FIG. 4 and its related descriptions.

In some embodiments, the transportation performance determination model 520 may be obtained by training with a large number of training samples with labels. Specifically, the training samples with labels are input into the transportation performance determination model 520 and the parameters of the transportation performance determination model 520 are updated by training. In some embodiments, training may be performed based on training samples through various methods. For example, training may be performed based on the gradient descent method. When the preset conditions are met, the training ends. The preset condition is that the loss function converges. In some embodiments, the training sample may include the historical gas pipeline map and historical difference rate, and the label may be the transportation performance corresponding to each node in the historical gas pipeline map. The historical gas pipeline map includes historical nodes, historical edges, historical node features and historical edge features. The label may be obtained by manual annotation.

Through the gas pipeline map described in some embodiments of the present disclosure, the pipeline network corresponding to the target gas pipeline section may be visualized, which is conducive to analyzing the transportation capacity of junction of the pipelines, and at the same time, introducing losses such as temperature, pressure, gas velocity, etc., and avoiding performance prediction deviation caused due to the inherent transmission loss of pipeline length. In addition, the transportation capacity determination model is used to realize the intelligent determination of transportation capacity of the pipeline section, thereby reducing the error caused by man-made judgment.

Figure 6:
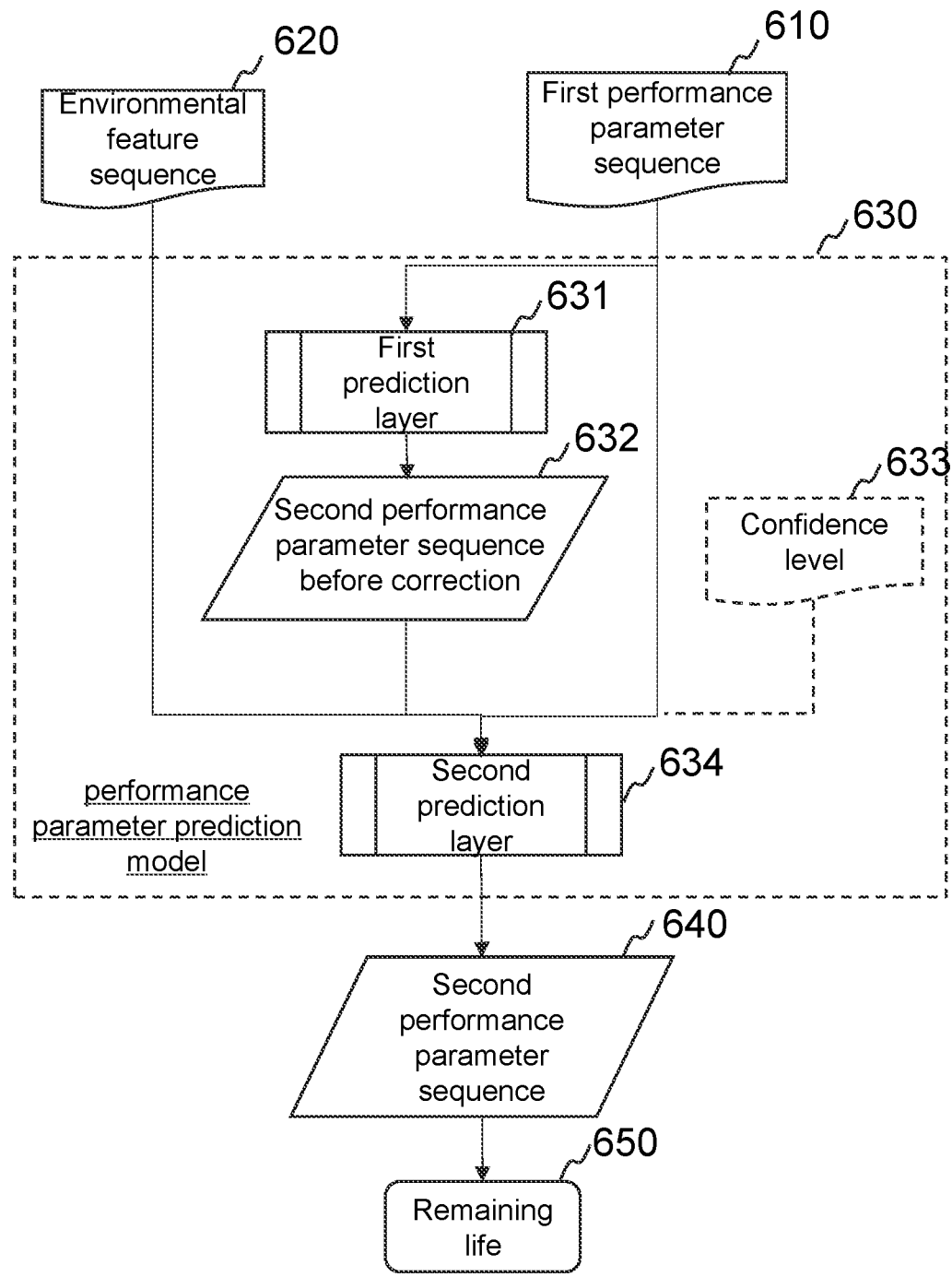
FIG. 6 is an exemplary structure diagram of a performance parameter prediction model according to some embodiments of the present disclosure.

FIG. 6 is an exemplary structure diagram of a performance parameter prediction model according to some embodiments of the present disclosure.

In some embodiments, the smart gas pipeline network device management sub-platform may predict the second performance parameter sequence of the target gas pipeline section within the second time period based on the first performance parameter sequence.

The second time period may be a certain time period in the future. For example, the second time period may be the 2 months of the future time period. In some embodiments, the second time period may be a certain time period after the first time period.

The second performance parameter may be the performance parameter of the target gas pipeline section within the second time period. The second performance parameter sequence is the sequence obtained by arranging the second performance parameter of at least one moment in chronological order within the second time period. The time sequence may be positive or reverse. For example, the second performance parameter sequence may include the second performance parameter 1, the second performance parameter 2, . . . , the second performance parameter N, etc. within a future time period. In some embodiments, the second performance parameter sequence includes at least one performance parameter at a future moment. In some embodiments, the second performance parameter sequence may be obtained by processing the first performance parameter sequence through mathematical fitting, artificial intelligence, etc. In some embodiments, the second performance parameter sequence may be determined through the target performance degradation model. For the specific description of the target performance degradation model, please refer to FIG. 6 and its related descriptions.

In some embodiments, the smart gas pipeline network device management sub-platform may determine the second performance parameter sequence 640 of the target gas pipeline section within the second time period through the performance parameter prediction model 630 based on the first performance parameter sequence 610.

Performance parameter prediction model 630 may be a machine learning model, for example, time sequence prediction model, etc. The input of the performance parameter prediction model 630 may include the first performance parameter sequence 610, and the output of the performance parameter prediction model 630 may include the second performance parameter sequence 640.

In some embodiments, the input of the performance parameter prediction model 630 may also include an environmental feature sequence 620. The smart gas pipeline network device management sub-platform may process the first performance parameter sequence 610 and the environmental feature sequence 620 through the performance parameter prediction model 630 to determine the second performance parameter sequence 640 of the target gas pipeline section within the second time period.

The environmental feature sequence 620 may be a plurality of environmental features arranged in chronological order. In some embodiments, the environmental feature sequence 620 may include weather data of the environment in which the target gas pipeline section is located at multiple time points within the first time period and/or the second time period, for example, environmental feature 1, environmental feature 2, . . . , environmental feature N, etc. In some embodiments, the environment feature sequence 620 may be obtained through the network, or sensors, crawling robots, etc.

In some embodiments, the performance parameter prediction model 630 may include a first prediction layer 631 and a second prediction layer 634. The input of the first prediction layer 631 may include the first performance parameter sequence 610, and the output of the first prediction layer 631 may include the second performance parameter sequence 632 before the correction. The input of the second prediction layer 634 may include the second performance parameter sequence 632, the confidence level 633, the first performance parameter sequence 610 and the environment feature sequence 620 before correction, and the output of the second prediction layer 634 may include the second performance parameter sequence 640.

The confidence level may be a parameter that reflects the credibility of the second performance parameter sequence before correction. In some embodiments, the confidence level may be related to the number of performance parameters in the second performance parameter sequence before the correction output from the first prediction layer, and the complexity of the gas pipeline map. For example, the number of performance parameters in the second performance parameter sequence before the correction is more, the complexity of the gas pipeline map is greater, it means that the data of the second performance parameter sequence before the correction is complete and the corresponding confidence level is greater. In some embodiments, confidence level may be determined based on the preset comparison relationship table between the confidence level and the number of performance parameters, or confidence level and complexity.

In some embodiments, the first prediction layer and the second prediction layer may be obtained through joint training. For example, the initial first prediction layer and initial second prediction layer may be trained based on a large number of training samples with labels. Training samples may include the confidence level of historical first performance parameter sequence, historical environmental feature sequence, and historical first performance parameter sequence. The label may be the corresponding second performance parameter sequence. The label may be obtained by manual annotation. The first historical performance parameter sequence in the training sample is input to the first prediction layer. The output of the first prediction layer, the confidence level of the first historical performance parameter sequence, the first historical performance parameter sequence and the historical environmental feature sequence are input to the second prediction layer to obtain the second performance parameter sequence output by the second prediction layer. The loss function is constructed based on the second performance parameter sequence with label and the second performance parameter sequence output from the second prediction layer, and the parameters of the first prediction layer and the parameters of the second prediction layer are updated synchronously. The trained first prediction layer and the trained second prediction layer may be obtained through parameter updating.

Through the performance parameter prediction model described by some embodiments of the present disclosure, intelligent prediction of the second performance parameter sequence may be achieved. In addition, by introducing environmental feature sequences and confidence level, the predicted second performance parameter sequence may be corrected to obtain a second performance parameter sequence that is more in line with real-time environment.

In some embodiments, the smart gas pipeline network device management sub-platform may determine the remaining life 650 of the target gas pipeline section based on the first performance parameter sequence 610 and/or the second performance parameter sequence 640. In some embodiments, the remaining life of the target gas pipeline section may be determined by a preset functional relationship based on the first performance parameter sequence and/or the second performance parameter sequence. For example, the first performance parameter sequence and/or the second performance parameter sequence may be in a linear function relationship with the remaining life of the target gas pipeline section, that is, the smaller each first performance parameter and/or the second performance parameter is, the smaller the remaining life may be in a linear function relationship. It may be understood that the preset function relationship may also include other relationships such as exponential function, power function, etc. Persons in the art may determine the specific preset function relationship through different use scenarios, which will not be repeated here.

Figure 7:
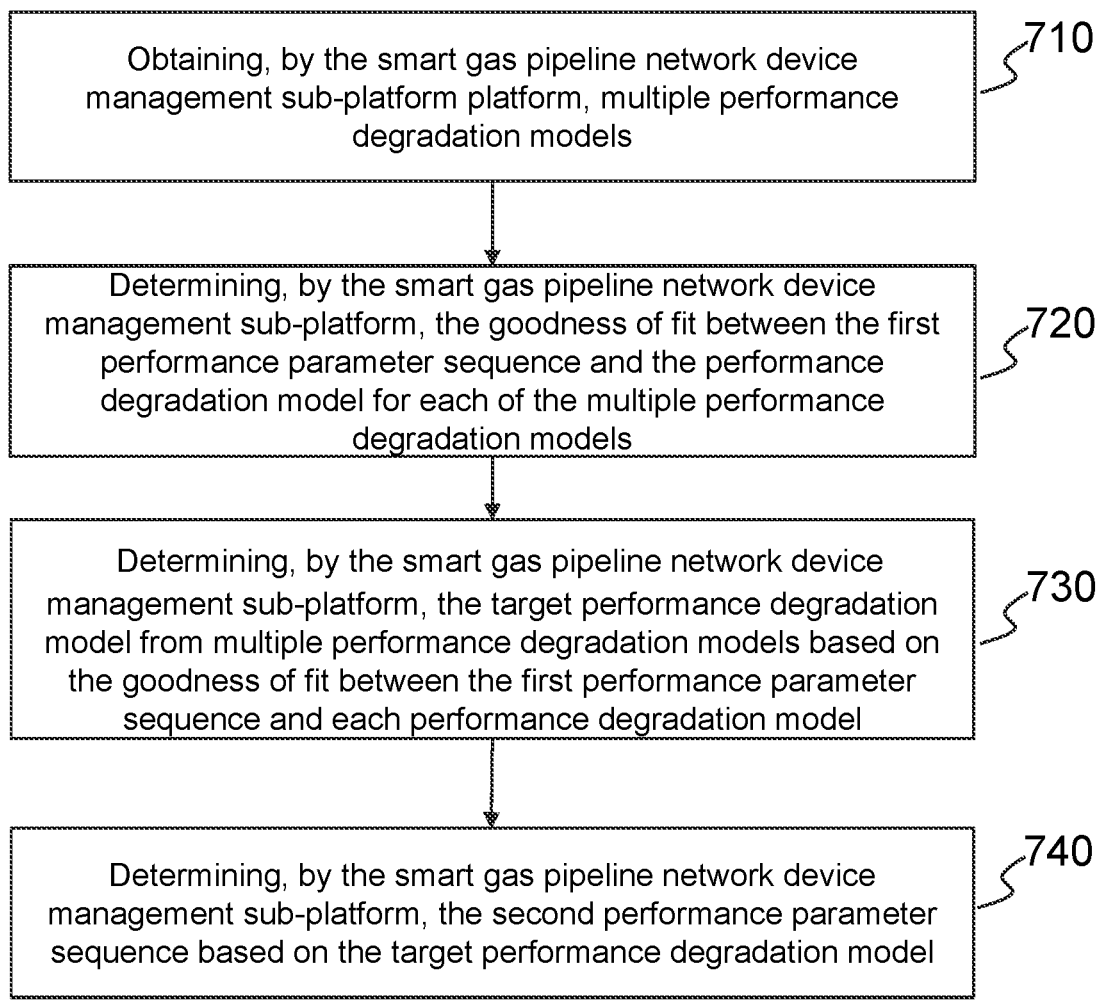
FIG. 7 is an exemplary flowchart of a process for determining a second performance parameter sequence according to some embodiments of the present disclosure.

FIG. 7 is an exemplary flowchart of a process for determining a second performance parameter sequence according to some embodiments of the present disclosure. In some embodiments, process 700 may be executed by the smart gas pipeline network device management sub-platform. As shown in FIG. 7, the process 700 includes the following steps.

Step 710, obtaining, by the smart gas pipeline network device management sub-platform platform, multiple performance degradation models.

Performance degradation model may be a model that reflects the change of the performance parameters of the target gas pipeline section over time. For example, performance parameter degradation models may include linear degradation models, nonlinear degradation models (such as power degradation models, exponential degradation models, logarithmic degradation models), etc. In some embodiments, the performance degradation model may be obtained through the network, or obtained by calling from the storage device, database, etc. Smart gas pipeline network device management sub-platform may also obtain multiple performance degradation models at the same time.

Step 720, determining, by the smart gas pipeline network device management sub-platform, the goodness of fit between the first performance parameter sequence and the performance degradation model for each of the multiple performance degradation models.

The goodness of fit may characterize the fitting matching degree between the first performance parameter sequence and the performance degradation model. For example, the higher the fitting degree of the regression curve of the performance degradation model and the first performance parameter sequence is, the greater the goodness of fit may be.

Step 730, determining, by the smart gas pipeline network device management sub-platform, the target performance degradation model from multiple performance degradation models based on the goodness of fit between the first performance parameter sequence and each performance degradation model.

The target performance degradation model may be the model used finally. In some embodiments, the smart gas pipeline network device management sub-platform may determine the performance degradation model with the highest goodness of fit among multiple performance degradation models as the target performance degradation model.

Step 740, determining, by the smart gas pipeline network device management sub-platform, the second performance parameter sequence based on the target performance degradation model.

In some embodiments, the smart gas pipeline network device management sub-platform may introduce the first performance parameter sequence into the target performance degradation model to determine the second performance parameter sequence through the model fitting.

In some embodiments, the smart gas pipeline network device management sub-platform may determine the remaining life of the target gas pipeline section based on the second performance parameter sequence obtained from the above method. For specific descriptions on determining the remaining life of the target gas pipeline section, please refer to FIG. 6 and its related description.

In some embodiments of the present disclosure, the second performance parameter sequence is determined by model fitting and regression, and the theoretical value of the second performance parameter sequence may be obtained by mathematical calculation, providing a theoretical reference for the subsequent determination of the actual remaining life.

The present disclosure provides a non-transitory computer-readable storage medium, which stores computer instructions. When the computer reads the computer instructions in the storage medium, the computer executes the method for smart gas pipeline life prediction based on safety as described above.

The basic concepts have been described above. Obviously, for those skilled in the art, the above detailed disclosure is only an example, and does not constitute a limitation of the present disclosure. Although it is not explicitly stated here, those skilled in the art may make various modifications, improvements, and amendments to the present disclosure. Such modification, improvement and amendment are recommended in the present disclosure, so such modification, improvement and amendment still belong to the spirit and scope of the exemplary embodiments of the present disclosure.

At the same time, the present disclosure uses specific words to describe the embodiments of the present disclosure. For example, "an embodiment", "one embodiment", and/or "some embodiments" refer to a certain feature, structure or feature related to at least one embodiment of the present disclosure. Therefore, it should be emphasized and noted that the "one embodiment" or "an embodiment" or "an alternative embodiment" mentioned twice or more in different positions in the present disclosure do not necessarily refer to the same embodiment. In addition, certain features, structures, or features in one or more embodiments of the present disclosure may be appropriately combined.

In addition, unless explicitly stated in the claims, the sequence of processing elements and sequences, the use of numbers and letters, or the use of other names described in the present disclosure are not used to define the sequence of processes and methods in the present disclosure. Although some embodiments of the present disclosure that are currently considered useful are discussed through various examples in the above disclosure, it should be understood that such details are only for the purpose of explanation, and the additional claims are not limited to the disclosed embodiments. On the contrary, the claims are intended to cover all amendments and equivalent combinations that conform to the essence and scope of the embodiments of the present disclosure. For example, although the implementation of various components described above may be embodied in a hardware device, it may also be implemented as a software only solution, e.g., an installation on an existing server or mobile device.

In the same way, it should be noted that, in order to simplify the expression disclosed in the present disclosure, and thus help understand one or more embodiments of the present disclosure, in the previous description of the embodiments of the present disclosure, various features are sometimes merged into one embodiment, the drawings, or the description thereof. However, this disclosure method does not mean that the features required by the object of the present disclosure are more than those mentioned in the claims. Rather, claimed subject matter may lie in less than all features of a single foregoing disclosed embodiment.

Some embodiments use numbers that describe the number of components and attributes. It should be understood that such numbers used to describe the embodiments are modified by the modifiers "approximately", "approximately" or "generally" in some examples. Unless otherwise specified, "approximately", "approximately" or "generally" indicates that the number is allowed to vary by ±20%. Accordingly, in some embodiments, the numerical parameters used in the present disclosure and claims are approximate values, which may be changed according to the characteristics required by individual embodiments. In some embodiments, the numerical parameter should consider the specified significant digits and adopt the method of general digit reservation. Although the numerical fields and parameters used to confirm the range breadth in some embodiments of the present disclosure are approximate values, in specific embodiments, such values are set as accurately as possible within the feasible range.

For each patent, patent application, patent application publication and other materials referenced in the present disclosure, such as articles, books, specifications, publications, documents, etc., all of which are hereby incorporated into the present disclosure for reference. Except for the application history documents that are inconsistent with or conflict with the content of the present disclosure, the documents that limit the broadest scope of claims in the present disclosure (currently or hereafter attached to the present disclosure) are also excluded. It should be noted that if there is any inconsistency or conflict between the description, definition, and/or use of terms in the attached materials of the present disclosure and the contents of the present disclosure, the description, definition, and/or use of terms in the present disclosure shall prevail.

Finally, it should be understood that the embodiments in the present disclosure are only used to explain the principles of the embodiments in the present disclosure. Other deformations may also fall within the scope of the present disclosure. Therefore, as an example rather than a limitation, the alternative configuration of the embodiments of the present disclosure can be regarded as consistent with the teachings of the present disclosure. Accordingly, the embodiments of the present disclosure are not limited to the embodiments explicitly introduced and described in the present disclosure.

What is claimed is:

1. A method for smart gas pipeline life prediction, wherein the method is implemented by a smart gas pipeline network device management sub-platform, the method comprising:

obtaining operation information of a target gas pipeline section within a first time period through a smart gas data center;

determining, based on the operation information, a first performance parameter of the target gas pipeline section of at least one moment within the first time period, wherein the first performance parameter at least includes transportation performance of the target gas pipeline section within the first time period;

determining, based on the first performance parameter of at least one moment, a first performance parameter sequence of the target gas pipeline section within the first time period, wherein the first performance parameter sequence is a sequence obtained by arranging the first performance parameter of at least one moment in a chronological order; and determining, based on the first performance parameter sequence, a remaining life of the target gas pipeline section, including predicting, based on the first performance parameter sequence, a second performance parameter sequence of the target gas pipeline section within a second time period, wherein the second performance parameter sequence includes performance parameter of at least one future moment; and determining, based on the first performance parameter sequence or the second performance parameter sequence, the remaining life of the target gas pipeline section;

wherein the predicting, based on the first performance parameter sequence, a second performance parameter sequence of the target gas pipeline section within a second time period includes:

determining, based on the first performance parameter sequence, the second performance parameter sequence of the target gas pipeline section within the second time period through a performance parameter prediction model, wherein the performance parameter prediction model is a time series prediction model, an input of the performance parameter prediction model includes the first performance parameter sequence and an environmental feature sequence, the environmental feature sequence includes a plurality of environmental features arranged in chronological order, the performance parameter prediction model includes a first prediction layer and a second prediction layer, an input of the first prediction layer includes the first performance parameter sequence, an output of the first prediction layer includes second performance parameter sequence before correction, an input of the second prediction layer includes the second performance parameter sequence before correction, a confidence level, the first performance parameter sequence, and the environmental feature sequence, an output of the second prediction layer includes the second performance parameter sequence, wherein the confidence level is related to a number of performance parameters in the second performance parameter sequence before correction and a complexity of a gas pipeline map.

2. The method of claim 1, wherein the method further comprises:
sending the remaining life of the target gas pipeline section to the smart gas data center, wherein the smart gas data center is used to send the remaining life of the target gas pipeline section to a smart gas service platform, and the smart gas service platform is used to send the remaining life of the target gas pipeline section to a smart gas user platform, and the smart gas user platform is used for a user to query the remaining life of the target gas pipeline section.

3. The method of claim 1, wherein the first performance parameter also includes pipeline integrity of the target gas pipeline section within the first time period, and the determining, based on the operation information, a first performance parameter of the target gas pipeline section of at least one moment within the first time period comprises:
obtaining an image of the target gas pipeline section through a crawling robot; and
determining, based on the image, the pipeline integrity of the target gas pipeline section through an image recognition model, wherein the image recognition model is a machine learning model.

4. The method of claim 1, wherein the determining, based on the operation information, a first performance parameter of the target gas pipeline section of at least one moment within the first time period comprises:
determining the gas pipeline map corresponding to the target gas pipeline section through the smart gas data center, wherein the gas pipeline map is a map of a connection relationship of multiple gas pipeline sections within a preset range of the target gas pipeline section; and
determining, based on the gas pipeline map, the transportation performance of the target gas pipeline section within the first time period by a transportation performance determination model, wherein the transportation performance determination model is a graph neural network model.

5. The method of claim 1, wherein predicting, based on the first performance parameter sequence, a second performance parameter sequence of the target gas pipeline section within the second time period comprises:
obtaining multiple performance degradation models;
for each of the multiple performance degradation models, determining a goodness of fit between the first performance parameter sequence and each performance degradation model;
determining, based on the goodness of fit between the first performance parameter sequence and each performance degradation model, a target performance degradation model from the multiple performance degradation models; and
determining, based on the target performance degradation model, the second performance parameter sequence.

6. A non-transitory computer-readable storage medium, wherein the storage medium stores computer instructions, when the computer reads the computer instructions in the storage medium, the computer executes the method of claim 1.

7. An Internet of Things system for smart gas pipeline life prediction, wherein the system comprises a smart gas safety management platform, the smart gas safety management platform includes a smart gas pipeline network device management sub-platform and a smart gas data center, and the smart gas pipeline network device management sub-platform is configured to:
obtain operation information of a target gas pipeline section within a first time period through the smart gas data center;
determine, based on the operation information, a first performance parameter of the target gas pipeline section of at least one moment within the first time period, wherein the first performance parameter at least includes transportation performance of the target gas pipeline section within the first time period;
determine, based on the first performance parameter of at least one moment, a first performance parameter sequence of the target gas pipeline section within the first time period, wherein the first performance parameter sequence is a sequence obtained by arranging the first performance parameter of at least one moment in a chronological order; and
determine, based on the first performance parameter sequence, a remaining life of the target gas pipeline section;
wherein the smart gas pipeline network device management sub-platform is further configured to:
predict, based on the first performance parameter sequence, a second performance parameter sequence of the target gas pipeline section within a second time period, wherein the second performance parameter sequence includes performance parameter of at least one future moment; and
determine, based on the first performance parameter sequence or the second performance parameter sequence, the remaining life of the target gas pipeline section;
wherein the smart gas pipeline network device management sub-platform is further configured to:
determine, based on the first performance parameter sequence, the second performance parameter sequence of the target gas pipeline section within the second time period through a performance parameter prediction model, wherein the performance parameter prediction model is a time series prediction model, an input of the performance parameter prediction model includes the first performance parameter sequence and an environmental feature sequence, the environmental feature sequence includes a plurality of environmental features arranged in chronological order, the performance parameter prediction model includes a first prediction layer and a second prediction layer, an input of the first prediction layer includes the first performance parameter sequence, an output of the first prediction layer includes second performance parameter sequence before correction, an input of the second prediction layer includes the second performance parameter sequence before correction, a confidence level, the first performance parameter sequence, and the environmental feature sequence, an output of the second prediction layer includes the second performance parameter sequence, wherein the confidence level is related to a number of performance parameters in the second performance parameter sequence before correction and a complexity of a gas pipeline map.

* * * * *